(12) United States Patent
Mori et al.

(10) Patent No.: US 8,477,413 B2
(45) Date of Patent: Jul. 2, 2013

(54) OPTICAL ELEMENT

(75) Inventors: Nobuyoshi Mori, Hachioji (JP); Kazuo Ishida, Hachioji (JP); Takuji Hatano, Suita (JP); Setsuo Tokuhiro, Tokorozawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 525 days.

(21) Appl. No.: 12/740,585

(22) PCT Filed: Oct. 27, 2008

(86) PCT No.: PCT/JP2008/069448
§ 371 (c)(1),
(2), (4) Date: Apr. 29, 2010

(87) PCT Pub. No.: WO2009/057551
PCT Pub. Date: May 7, 2009

(65) Prior Publication Data
US 2010/0258187 A1 Oct. 14, 2010

(30) Foreign Application Priority Data
Nov. 2, 2007 (JP) ................................. 2007 286675

(51) Int. Cl.
*G02B 5/28* (2006.01)
*F21V 9/00* (2006.01)
(52) U.S. Cl.
USPC ........... 359/359; 359/360; 359/584; 359/585; 359/589; 359/853

(58) Field of Classification Search
USPC ................. 359/359, 360, 584, 585, 589, 851, 359/853, 884; 136/246, 259
See application file for complete search history.

(56) References Cited

U.S. PATENT DOCUMENTS

| 4,209,222 | A | * | 6/1980 | Posnansky | 359/359 |
| 5,177,396 | A | * | 1/1993 | Gielen et al. | 313/113 |
| 5,563,734 | A | * | 10/1996 | Wolfe et al. | 359/360 |
| 6,252,155 | B1 | * | 6/2001 | Ortabasi | 136/246 |

(Continued)

FOREIGN PATENT DOCUMENTS

| JP | 03-293301 | 12/1991 |
| JP | 09-15407 | 1/1997 |

(Continued)

OTHER PUBLICATIONS

Machine translation of JP 09-015407A from http://www4.ipdl.inpit.go.jp/.*

*Primary Examiner* — Frank Font
(74) *Attorney, Agent, or Firm* — Cozen O'Connor

(57) ABSTRACT

An optical element for reflecting solar light has excellent weather resistance, and furthermore, a high reflectance in a wide band. When solar light enters an optical element (OE), light (L1) in a short wavelength band among the solar light is reflected by a dielectric multilayer film (DF). Other light (L2) in longer wavelength bands are passed through the dielectric multilayer film (DF), then a base material (SS), and reflected by a metal deposition film (MV) to pass through the base material (SS) and the dielectric multilayer film (DF). Thus, high reflectance in a wide band is ensured.

8 Claims, 14 Drawing Sheets

U.S. PATENT DOCUMENTS

| | | | |
|---|---|---|---|
| 7,385,659 B2 * | 6/2008 | Kotchick et al. | 349/114 |
| 7,638,708 B2 * | 12/2009 | Fork et al. | 136/246 |
| 7,790,978 B1 * | 9/2010 | Dziendziel et al. | 136/253 |
| 7,851,054 B2 * | 12/2010 | Weber et al. | 428/220 |
| 2007/0137691 A1 * | 6/2007 | Cobb et al. | 136/246 |
| 2007/0178316 A1 | 8/2007 | Mellott | |
| 2011/0134515 A1 * | 6/2011 | Banerjee et al. | 359/359 |

FOREIGN PATENT DOCUMENTS

| | | |
|---|---|---|
| JP | 11-119105 | 4/1999 |
| JP | 11-508379 | 7/1999 |
| JP | 2002-254550 | 9/2002 |
| JP | 2006-227099 | 8/2006 |

* cited by examiner

OPTICAL ELEMENT

RELATED APPLICATIONS

This is a U.S. National Phase Application under 35 U.S.C. 371 of International Application PCT/JP2008/069448, filed on Oct. 27, 2008.

This application claims the priority of Japanese Application No. 2007-286675 filed on Nov. 2, 2007, the entire content of which is hereby incorporated by reference.

TECHNICAL FIELD

The present invention relates to an optical element, in particular, to an optical element suitably used to reflect sunlight in a sunlight condensing system to utilize sunlight as energy.

BACKGROUND ART

Thermal power generation which burns fossil fuel and generates electric power has comparatively low facility cost and the restriction for the installation of an electric power plant is not sever, thermal power generation has been widely used all over the world. Incidentally, the amount of emission of $CO_2$ (carbon dioxide) to cause global warming is increasing continuously every year, therefore, there is the actual circumstances that the reduction of $CO_2$ becomes urgent requirement from a viewpoint of global environment protection. Moreover, since an amount of fossil fuel is limited, fossil fuel should be utilized with saving so as not to be depleted before an energy production technique taking a position of thermal power generation is established. For this reason, although other electric power generating techniques to supplement thermal power generation have been sought, there is a problem that nuclear power generation and hydraulic power generation are hard to be utilized, because the installation of their electric power plants is restricted.

On the other hand, as clean energy which does not give a load to the environment, sunlight energy attracts attention. Generally as a method of changing sunlight into energy, a solar battery has been well known. However, with a current technique, there is the actual circumstance that the electric power generating cost of a solar battery is relatively high in comparison with other plants.

In contrast to this, it has been also considered that sunlight is used directly as energy at relatively low cost Patent Document 1 discloses a technique that sunlight is condensed and changed into heat energy and the heat energy is converted into electrical power. More concretely, in the technique, sunlight is reflected by a large number of reflective mirrors (heliostat) arranged a tower and is condensed into a heat exchanging unit by a condensing mirror mounted on the tower so as to heat the heat exchanging unit, and then the heat energy obtained by the heat exchanging unit is sent to an electric power generating unit, whereby electric power is generated.

Patent document 1: Japanese Patent Unexamined Publication No. 11-119105

DISCLOSURE OF THE INVENTION

Problem to be Solved by the Invention

Incidentally, in order to convert sunlight into energy efficiently, there is a problem that how to set up the optical characteristic of a reflective mirror. FIG. 1 is a diagram showing an energy distribution of sunlight. A dotted line shows energy in solar insolation in outer space, and a solid line shows energy in solar insolation on the ground. The energy in solar insolation on the ground includes roughly energy contained in ultraviolet radiation in an amount of 8%, energy contained in visible light in an amount of 44%, and energy contained hi infrared light in an amount of 48%. Therefore, in order to utilize the energy of sunlight efficiently, it is necessary to increase reflective characteristics to cover a wide wavelength band including up to a range of infrared light.

Here, in a common reflective mirror, an Ag vapor-deposited film is used in many cases. As shown in FIG. 2, since the Ag vapor-deposited film has a reflectance ratio of 90% or more in a wide band of a wavelength of 0.4 µm or more, it can be said that the Ag vapor-deposited film is suitable to reflect sunlight. However, Ag has a problem that it tends to easily oxidize. Therefore, if a reflective mirror provided with an Ag vapor-deposited film is installed in outdoors for reflecting sunlight, there is a possibility that reflective characteristics may deteriorate for a short period of time. On the other hand, as compared with Ag, Al (aluminum) has a characteristic that it hardly oxidizes. However, as shown in FIG. 2, there is a problem that a reflectance ratio is low in a band of a wavelength of 0.6 µm to 1.0 µm.

On the other hand, in precision optical devices etc., a technique to reflect light with a dielectric multilayer is known. By the use of such a dielectric multilayer, it becomes possible to obtain a high reflectance ratio even in a wide wavelength band. However, in order to correspond to the wide wavelength band, it may be necessary to increase the number of layers. As a result, the thickness of a film tends to become ticker. However, in the case of reflecting light with such a dielectric multilayer with a large thickness, if light enters its reflective surface from a direction vertical to the reflective surface, there is no problem. However, as an incidence angle of light to the reflective surface become smaller, the optical path length of light passing through the dielectric multilayer becomes longer. As a result, there is problem that it becomes difficult to obtain an expected reflective characteristic. This means that when sunlight enters with a shallow incidence angle in morning or evening, the utilization efficiency of light decreases.

The present invention has been achieved in view of these problems, and an object of the present invention is to provide an optical element for reflecting sunlight, which is excellent in resistance to weather and has a high reflectance ratio in a wide wavelength band.

Means for Solving the Problems

In a plate-shaped optical element for reflecting sunlight, the optical element of the present invention is characterized in that a dielectric multilayer and a metal vapor-deposited film are formed on at least one of a surface where sunlight enters and a surface opposite to the surface of a base plate and the above-mentioned dielectric multilayer is formed on a surface where sunlight enters than the above-mentioned metal vapor-deposited film.

Further, in a plate-shaped optical element for reflecting sunlight, the optical element of the present invention is characterized in that a first reflective film is formed on a surface of a base plate where sunlight enters and a second reflective film to reflect light with a wavelength band having passed through the first reflective film is formed on a surface opposite to the surface of the base plate where sunlight enters.

Effect of Invention

With reference to FIG. 2, for example, an Al vapor-deposited film has characteristics that although a reflectance ratio in a band of a wavelength of 0.6 µm to 1.0 µm is relatively low, a reflectance ratio in a wavelength band except the above wavelength band is 90% or more. On the other hand, a dielectric multilayer has a feature that generally, the number of layers can be refrained to few, if a wavelength band to be reflected is restricted to narrow. Then, in the present invention, a region where the reflectance ratio of a metal vapor-deposited film is low is compensated with the reflection of a dielectric multilayer so that a high reflectance ratio can be obtained over a wide wavelength band as a whole. With this way, it becomes possible to reduce the number of layers of a dielectric multilayer and to reflect light entering with a shallow incidence angle with a high reflectance ratio.

Here, an important point is that since a dielectric multilayer is made such that a low refractive layer and a high refractive layer are laminated, the dielectric multilayer has a characteristic to allow light in a wavelength band other than its reflecting wavelength band to pass through itself different from a metal vapor-deposited film. Therefore, if a dielectric multilayer is formed at a light-entering side than the metal vapor-deposited film, light in a wavelength band where the dielectric multilayer has a high reflectance ratio, is reflected by the dielectric multilayer with the high reflectance ratio. On the other hand, light in a wavelength band where the dielectric multilayer has a low reflectance ratio passes through the dielectric multilayer, and thereafter, is reflected by the metal vapor-deposited film with a high reflectance ratio. Therefore, even if a metal vapor-deposited film and a dielectric multilayer are laminated, these films are refrained from restricting reflection with each other, whereby it can be possible to realize reflection with high efficiency by the total.

There is no restriction in a kind of metals to be vapor-deposited. However, it is desirable to use aluminum from viewpoints of cost, resistance to weather, etc. The dielectric multilayer is made such that a high refractive index layer and a low refractive index layer are laminated. For example, it is disclosed in Japanese Unexamined Patent Publication No. 2005-292462. The base plate is desirably glass or plastic.

It is desirable that the above-mentioned dielectric multilayer has a reflectance ratio of 90% or more for light with a wavelength of 1.0 µm or less, and the above-mentioned metal vapor-deposited film has a reflectance ratio of 90% or more for light with a wavelength of 1.0 µm or more.

It is desirable that the above-mentioned dielectric multilayer is formed on a surface of the above-mentioned base plate where sunlight enters and the above-mentioned metal vapor-deposited film is formed on a surface of the above-mentioned base plate opposite to the surface where sunlight enters. However, a dielectric multilayer and a metal vapor-deposited film may be formed on a surface where sunlight enters, or a dielectric multilayer and a metal vapor-deposited film may be formed on a surface opposite to a surface where sunlight enters.

EXPLANATION OF REFERENCE SYMBOLS

1 Elliptic Mirror
2 Supporting Tower
3 Heat Exchange Facility
4 Condensing Mirror
5 Heliostat
6 Supporting Pole
7 Fork
8 Ring-shaped Rail 9 Rotating Pulley
10 Pressing Pulley
11 Motor
12 Timing Belt
13 Concave Mirror
14 Circular Pipe
15 Rotating Shaft
16 Circular Rail
17 Rotating Pulley
18 Pressing Pulley
19 Power Pulley
20 Motor
21 Timing Belt
22 Arm
23 Sensor
31 Lower Opening
L Sunlight
L1 Light
L2 Light
MV Metal Vapor-deposited Film
OE Optical element
SS Base Plate

BEST MODE FOR CARRYING OUT THE INVENTION

Figure 1:
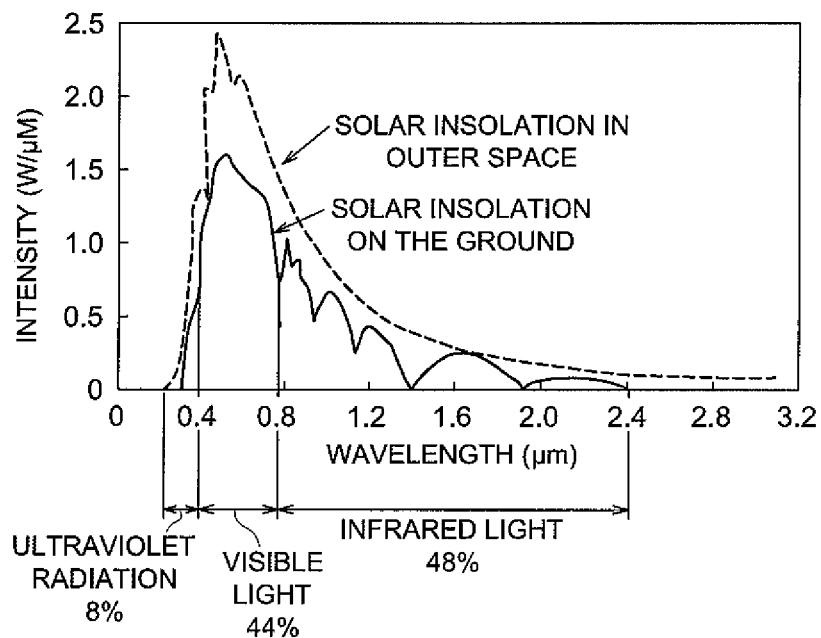
FIG. 1 is a diagram showing an energy distribution of sunlight.
Figure 2:
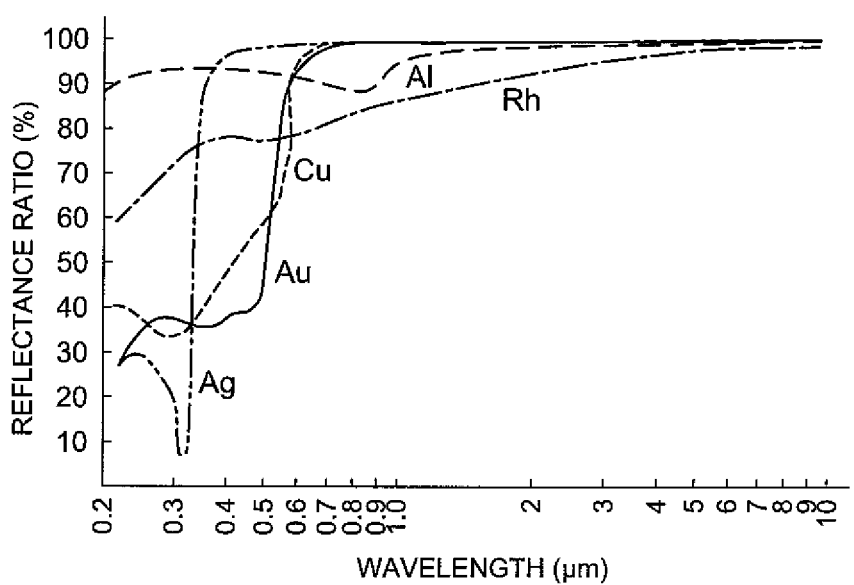
FIG. 2 is a graph showing a reflectance ratio of metals for wavelength of light.
Figure 3:
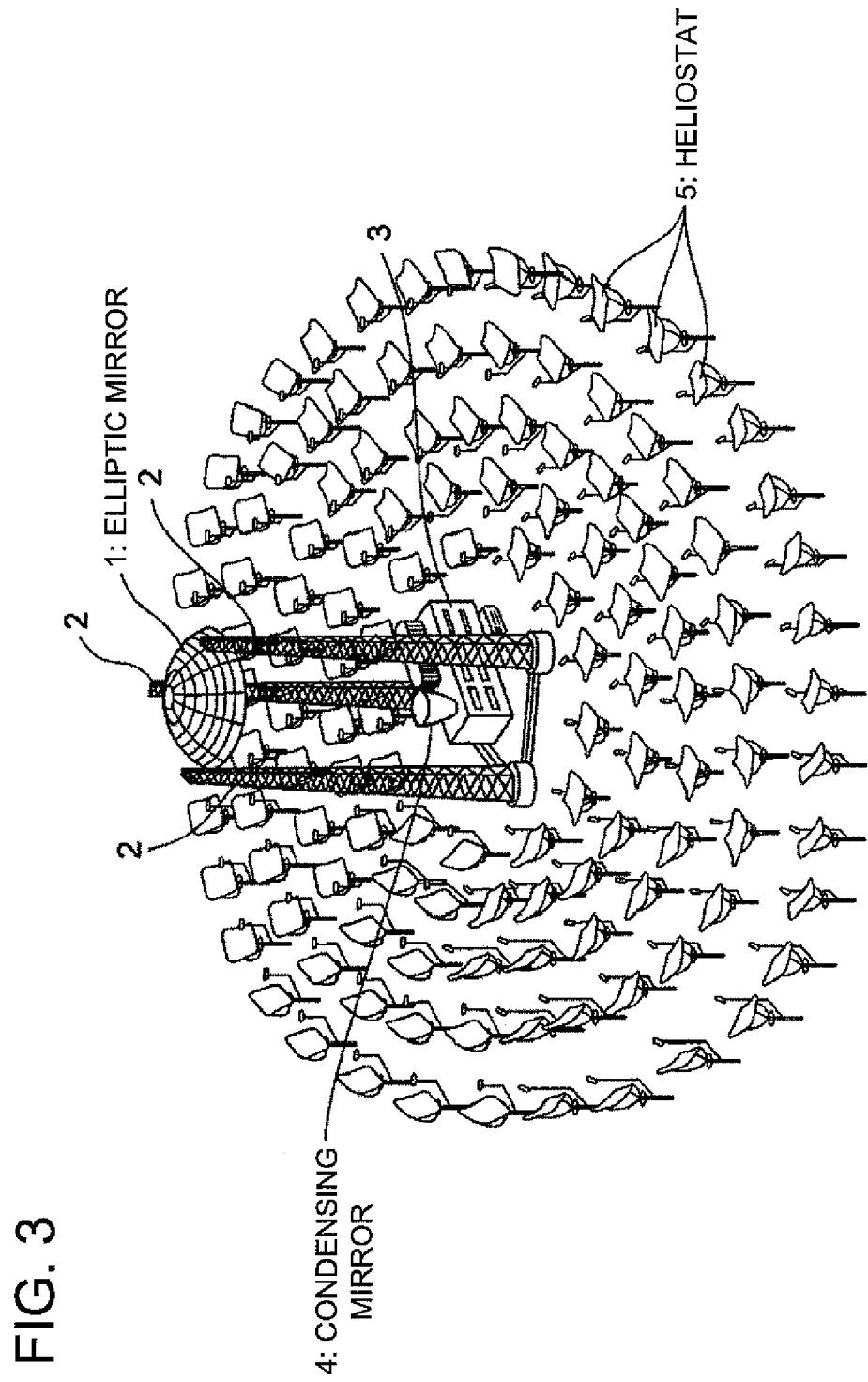
FIG. 3 is a perspective view of a sunlight condensing system employing an optical element according to the present invention.
Figure 4:
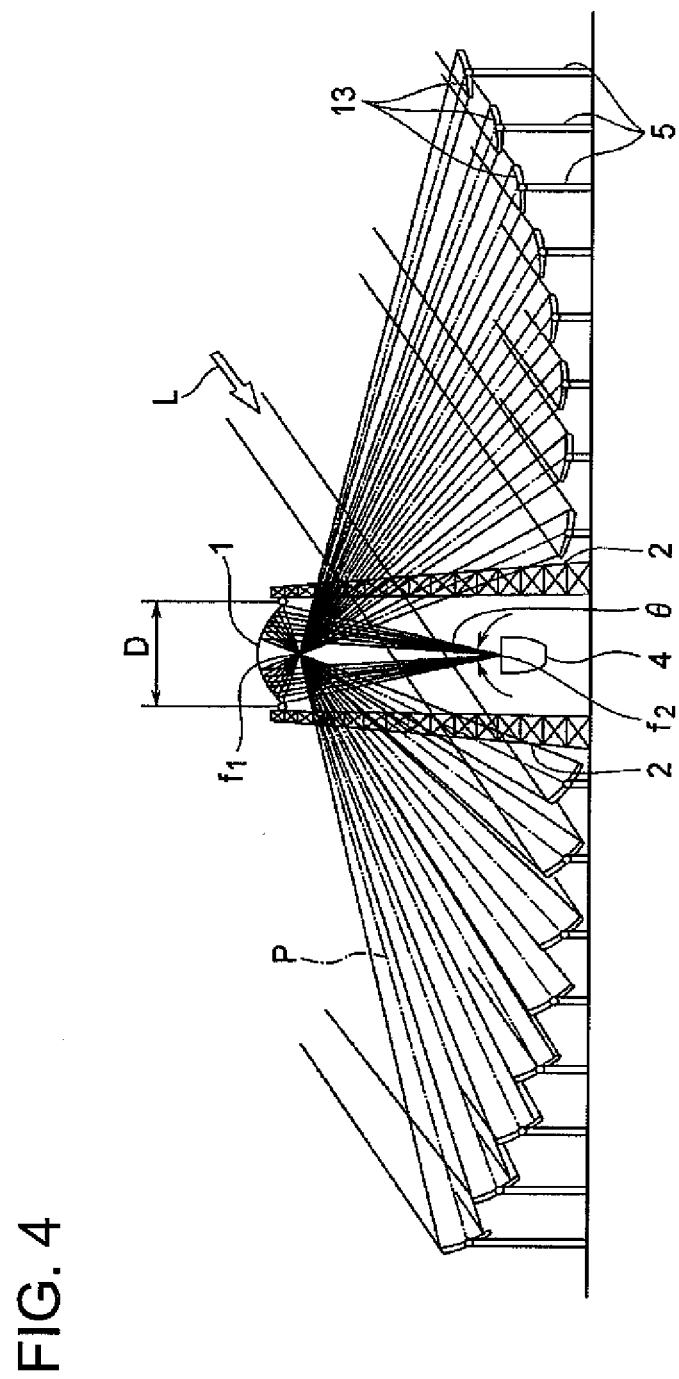
FIG. 4 is a view looking the sunlight condensing system according to the present invention from its side.

Hereafter, with reference to drawings, an embodiment of the present invention will be described more in detail. FIG. 3 is a perspective view of the sunlight condensing system employing an optical element according to the present invention. FIG. 4 is a drawing viewing this sunlight condensing system from its side. In FIGS. 3 and 4, an elliptic mirror 1 having a relatively large diameter is supported by three supporting towers 2 at a position with a predetermined height on the condition that its reflective surface faces downward. Under the elliptic mirror 1, built is a heat exchange facility 3 which accommodates a heat exchanging unit to convert sunlight L into heat energy, and on the upper part of this heat-exchange facility 3, a condensing mirror 4 is installed. Further, on the ground around the heat exchange facility 3, a number of heliostats 5 are arranged on the condition that the heliostats 5 surround the elliptic mirror 1.

Figure 5:
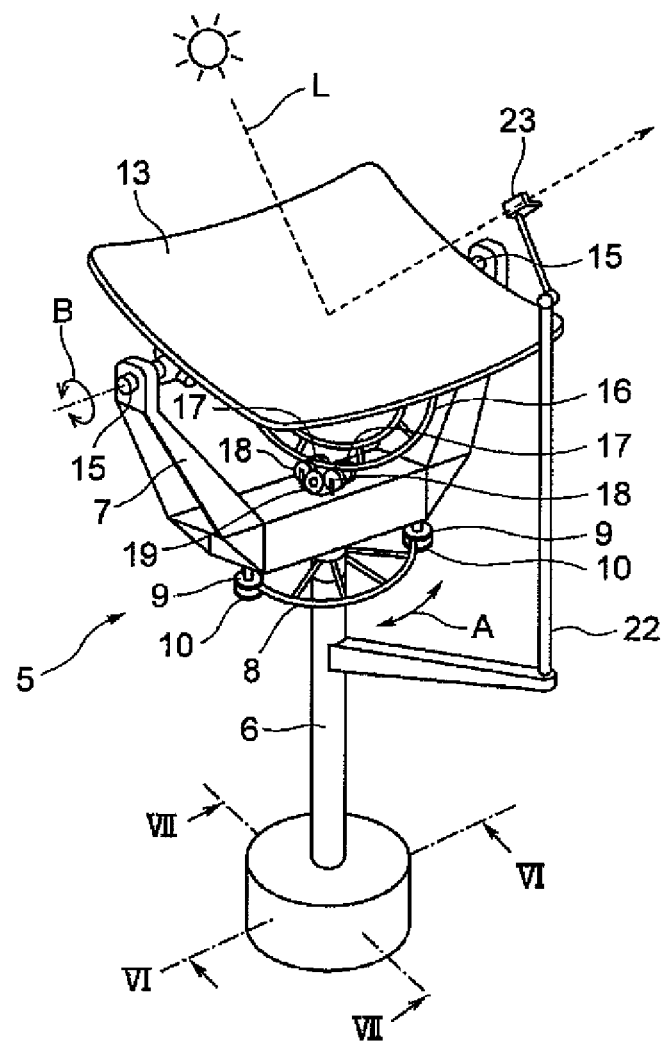
FIG. 5 is a perspective view of a heliostat 5.
Figure 6:
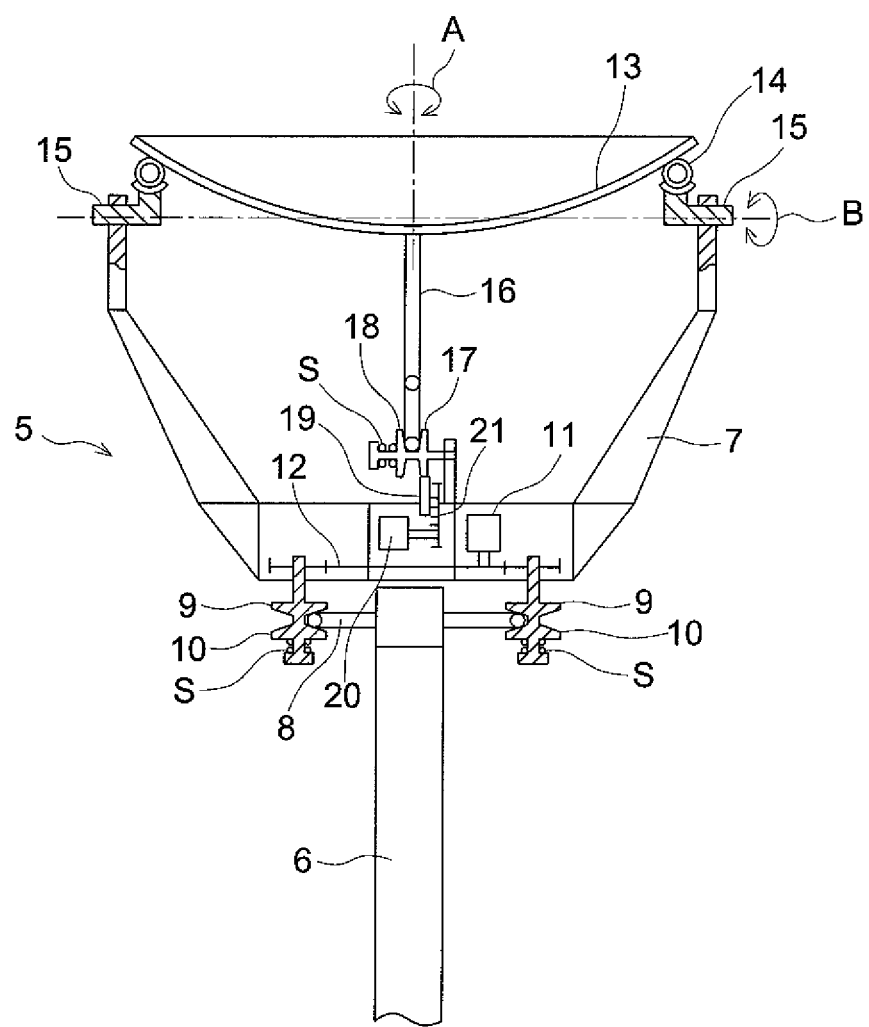
FIG. 6 is a view of the structure of FIG. 5 which is cut at a plane including a VI-VI line and looked to the arrowed mark direction.
Figure 7:
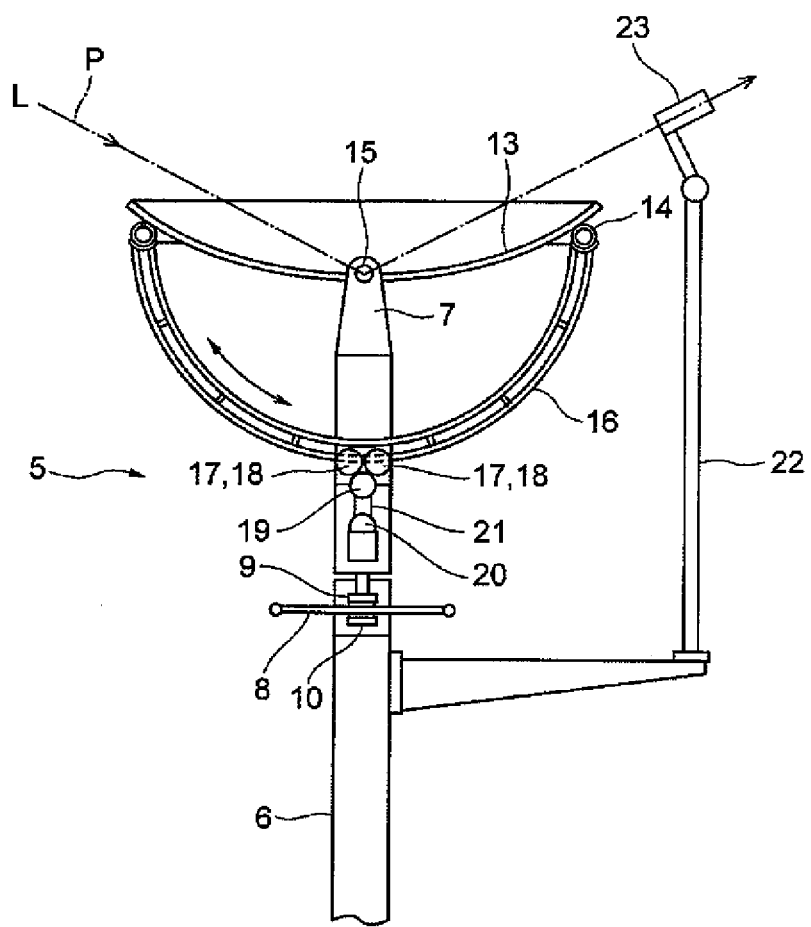
FIG. 7 is a view of the structure of FIG. 5 which is cut at a plane including a VII-VII line and looked to the arrowed mark direction.

FIG. 5 is a perspective view of a heliostat 5. FIG. 6 is a view of the structure of FIG. 5 which is cut at a plane including a VI-VI line and looked to the arrowed mark direction. FIG. 7 is a view of the structure of FIG. 5 which is cut at a plane including a VII-VII line and looked to the arrowed mark direction. In FIG. 5, a supporting pole 6 of the heliostat 5 is installed on the ground and is extended vertically, and, to the upper part of the supporting pole 6, a fork 7 is attached such that the fork 7 can rotate and shift freely in the direction of an azimuth angle (A direction) in connection with the supporting pole 6. Further, around the upper end of the supporting pole 6, a ring-shaped rail 8 is provided. Furthermore, the underside of fork 7, rotating pulleys 9 are rotatably mounted at opposite positions across the supporting pole 6, respectively, and pressing pulleys 10 are provided adjacently to the rotating pulleys 9 and are urged toward the rotating pulleys 9 with aid of springs S (S in FIG. 6). Between the rotating pulleys 9 and the pressing pulleys 10, a ring-shaped rail 8 is pinched and held. A timing belt 12 is stretched and wound around the pair of rotating pulleys 9 so that the pair of rotating pulleys 9 rotates synchronously. Accordingly, when a motor 11 is driven, the rotating pulleys 9 rotate via the timing belt 12, whereby the fork 7 rotates in the direction of an azimuth angle along the ring-shaped rail 8. At this time, since the ring-shaped rail 8 is pressed with the pressing pulleys 10, the fork 7 can perform a stable rotation.

On the upper end of the fork 7, a concave mirror 13 is held so as to rotate and shift freely in the direction of an elevation angle (B direction). The concave mirror 13 is shaped in the form of a rectangular plate and has a reflective surface being a curved surface (including an aspheric surface, a paraboloidal surface, etc.). However, this reflective surface may be a flat surface.

Circular pipes 14 are fixed to the reverse side of the concave mirror 13. As shown in FIG. 6, at the central point of each of opposite sides of the concave mirror 13, rotation shafts 15 are fixed to the circular pipes 14 respectively so as to align along an axis. The pair of rotation shafts 15 extending in the horizontal direction is supported on the upper end of the fork 7. Therefore, the concave mirror 13 is adapted to be rotatable around the axis of the rotation shafts 15 in the direction of elevation angle.

On the other hand, as shown in FIG. 7, at the central point of each of two sides different from the two sides on which the rotation shafts 15 are provided, the both ends of the circular rail 16 are fixed. On the bottom plane at the central section of the fork 7, two sets of a rotating pulley 17 and a pressing pulley 18 being urged with a spring (not shown in the drawing) are provided, and the circular rail 16 is pinched and supported by each of the rotating pulley 17 and the pressing pulley 18. Further, to the fork 7, a power pulley 19 is provided so as to engage with both of the rotating pulleys 17, and around the power pulley 19, stretched and wound is a timing belt 21 to which power is transmitted from a motor 20. With the above configuration, when the motor 20 is driven, the power pulley 19 and the rotating pulley 17 are rotated through the timing belt 21, whereby the circular rail 16 is shifted relatively, and the concave mirror 13 can rotate around the rotation shafts 15 and shift in the direction of elevation angle. Herein, in order to make the adjustment of the heliostat 5 easy, a red seal (coloring section) and the like may be pasted on a part of the concave mirror 13 such that it makes possible to confine visually the direction in which light proceeds. After the adjustment, the red seal may be removed.

The height of the concave mirror 13 of the heliostat 5 becomes gradually high as the position of the concave mirror 13 separates from the elliptic mirror 1 at the central section. This is because a concave mirror 13 is made to be prevented from becoming a shadow for another concave mirror 13 at the time of reflecting sunlight, whereby a shading loss can be prevented from taking place.

Figure 8:
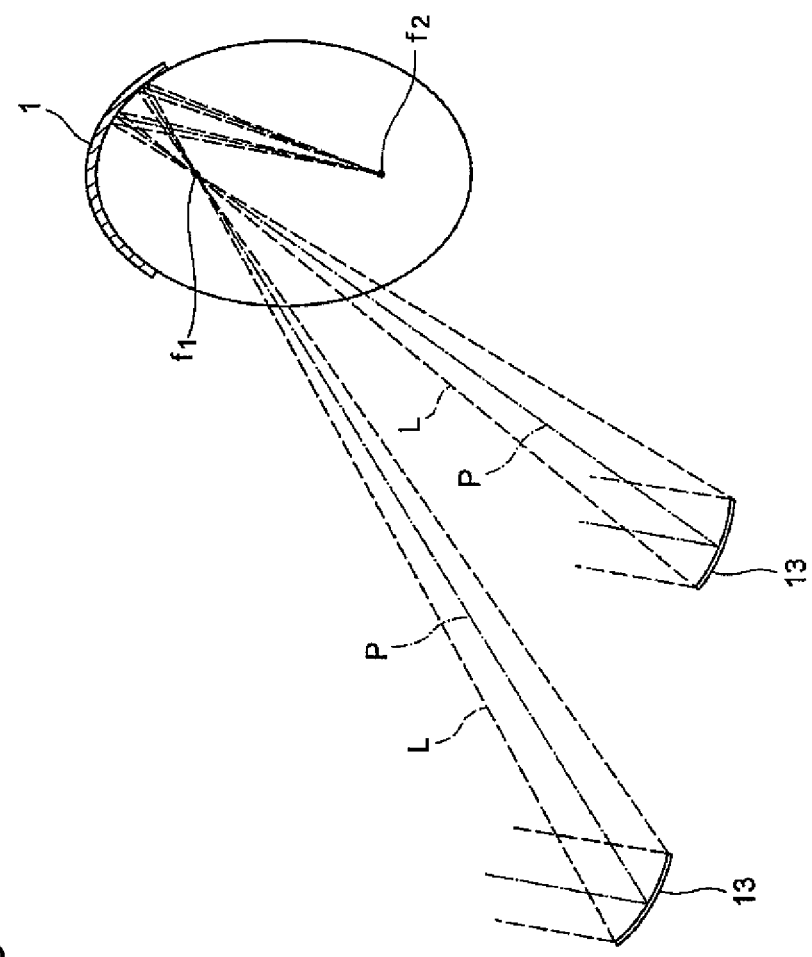
FIG. 8 is a diagram showing a relationship in terms of the position of focal point between an elliptic mirror and a concave minor.

Moreover, in FIG. 5, a sensor 23 is fixed to the supporting pole 6 of the heliostat 5 through an arm 22 attached the supporting pole 6. The sensor 23 is used to detect the incidence direction of sunlight L. That is, motors 11 and 20 are controlled by signals outputted from the sensor 23, so that the sunlight L reflected on the concave mirror 13 always proceeds to the first focal point f1 (refer to FIG. 8) of the elliptic mirror 1. With this, even if the incidence direction of sunlight L changes in accordance with the passage of time, it is made possible to reflect the sunlight L from the concave mirror 13 toward the first focal point f1 of the elliptic mirror 1 surely. Sunlight reflected from each concave mirror 13 toward the elliptic mirror 1 is further reflected on the elliptic mirror 1 and proceeds to a condensing mirror 4.

Figure 9:
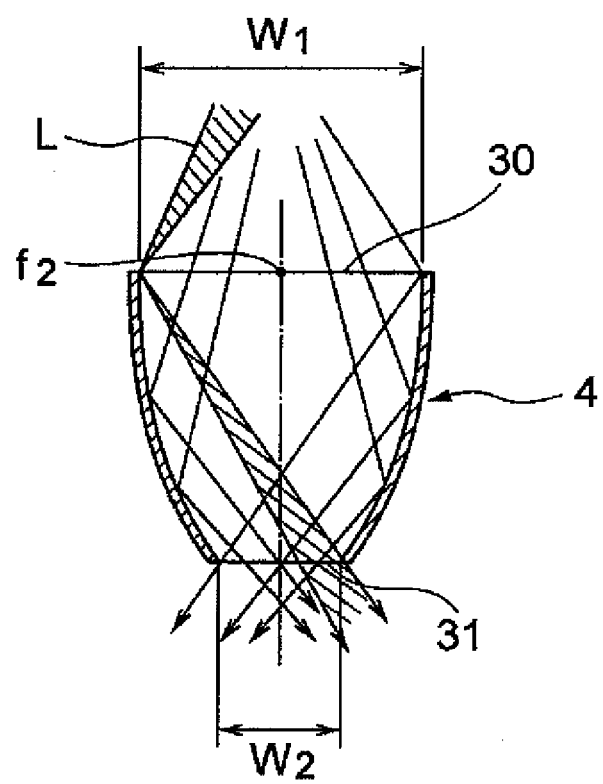
FIG. 9 is a cross sectional view of a condensing mirror.

With regard to reflection on the inside of this condensing mirror 4, it may be preferable in consideration of loss of light that, as shown in FIG. 9, the light having entered from an upper opening 30 exits from a lower opening 31 having a narrowed diameter by being reflected only one time on the inside. However, it may be free to make the lower opening 31 with the small diameter such that the light is reflected two times or more on the inside. The sunlight L which has exited from the lower opening 31 is sent into the heat exchange facility 3, and is converted into heat energy by a predetermined heat exchanging unit, whereby electric power can be generated by the utilization of the heat energy.

Figure 10:
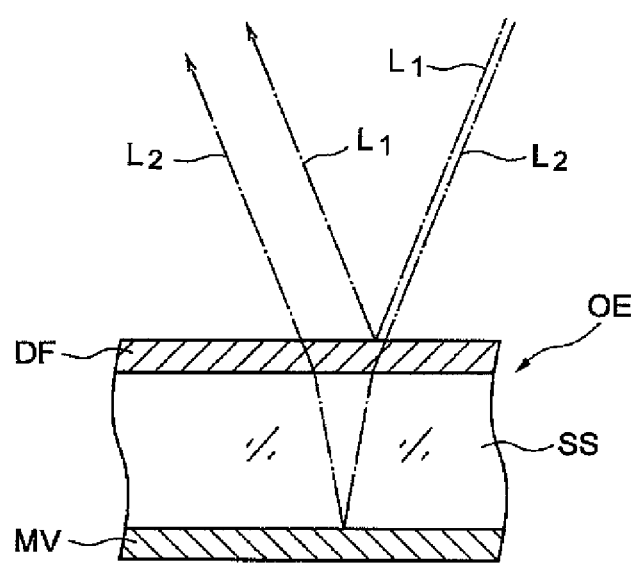
FIG. 10 is a cross sectional view of a reflective surface of an optical element OE.

Examples of an optical element capable of being applied with the present invention include the elliptic mirror 1, the concave mirror 13, and the condensing mirror 4. FIG. 10 shows a cross sectional view of a reflecting surface of such an optical element OE. For the purpose of making it easy to understand, the film thickness is illustrated to be thicker than the actual size in comparison with the thickness of a base plate. As a reflective surface, on a surface of a parallel plate-shaped glass or plastic base plate SS where sunlight enters, a dielectric multilayer DF is fanned, and, on another surface opposite to the above surface, a metal vapor-deposited layer MV is fanned. Here, the dielectric multilayer DF has a high reflectance ratio for light only in a short wavelength band. Therefore, when sunlight enters the optical element OE, among the sunlight, light L1 in the short wavelength band is reflected on the dielectric multilayer DF. On the other hand, light l2 in a long wavelength band other than the light L1 passes through the dielectric multilayer DF, further passes through the base plate SS, is reflected on the metal vapor-deposited layer MV, further passes through again the base plate SS, and passes through the dielectric multilayer DF. With this, it is possible to secure a high reflectance in a wide wavelength band.

Figure 11:
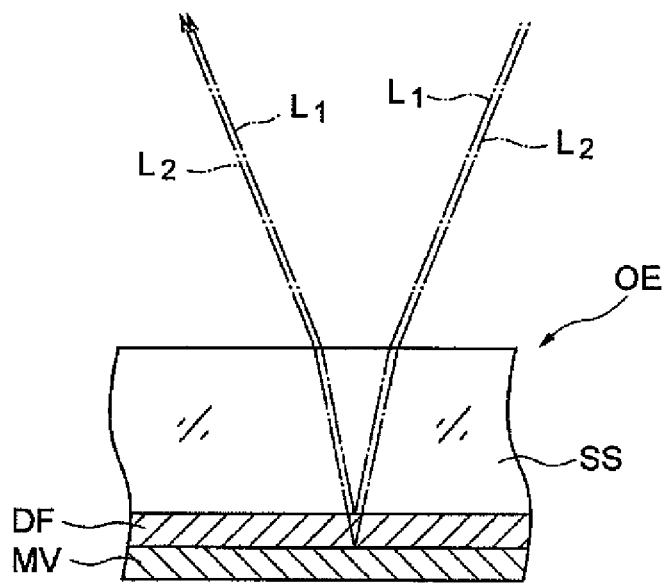
FIG. 11 is a cross sectional view of a reflective surface of an optical element OE according to another embodiment.

FIG. 11 is a cross sectional view of a reflective surface of an optical element OE according to another embodiment. In this embodiment, on a surface opposite to a surface on which sunlight enters, a dielectric multilayer DF and a metal vapor-deposited layer MV are formed in this order from a light-entering side. This embodiment is preferable for the concave mirror 13, because the base plate acts as a protective layer for the dielectric multilayer DF and the metal vapor-deposited layer MV.

Figure 12:
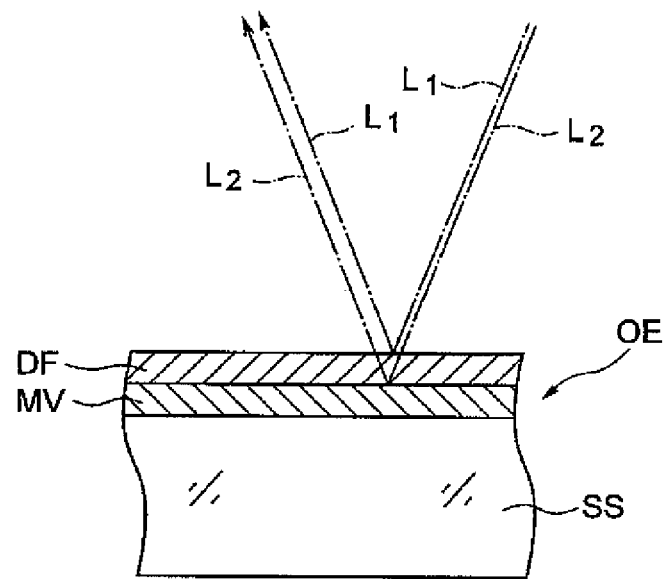
FIG. 12 is a cross sectional view of a reflective surface of an optical element OE according to another embodiment.

FIG. 12 is a cross sectional view of a reflective surface of an optical element OE according to another embodiment. In this embodiment, on a surface on which sunlight enters, a dielectric multilayer DF and a metal vapor-deposited layer MV are formed in this order from a light-entering side. This embodiment is preferable for the elliptic mirror 1, because the sunlight having entered is reflected on the dielectric multilayer DF and the metal vapor-deposited layer MV and does not pass through the base plate SS so that there is no fear that the base plate is heated.

Example 1

The film thickness data of the dielectric multilayer used in Example suitably for an optical element shown in FIG. 10 are shown in Table 1.

Figure 13:
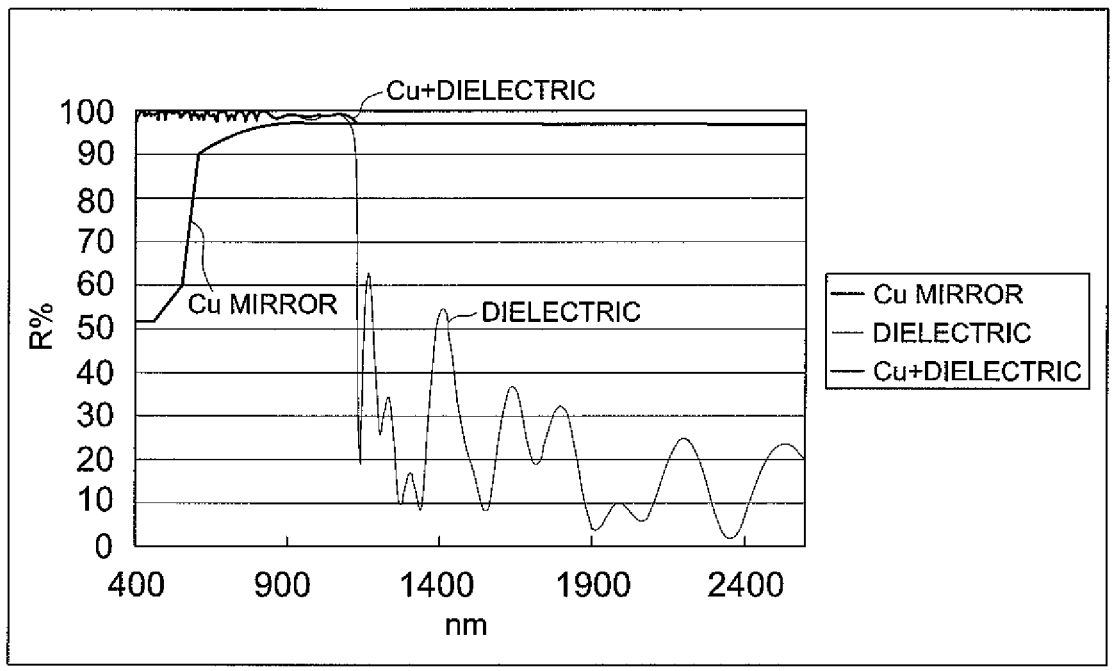
FIG. 13 is a drawing showing the reflection characteristic at the time that light was made to enter with an incidence angle of 20 degrees, in the example in which a metal vapor-deposited film made from a material of Cu and the dielectric multilayer were formed.
Figure 14:
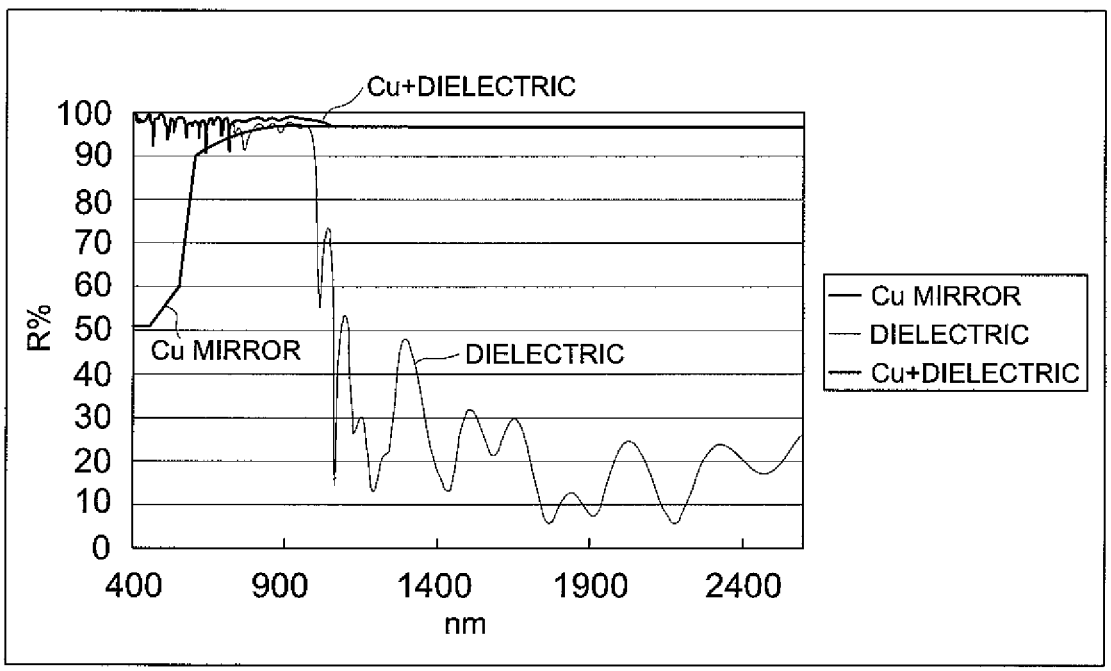
FIG. 14 is a drawing showing the reflection characteristic at the time that light was made to enter with an incidence angle of 50 degrees, in the example in which a metal vapor-deposited film made from a material of Cu and the dielectric multilayer were formed.
Figure 15:
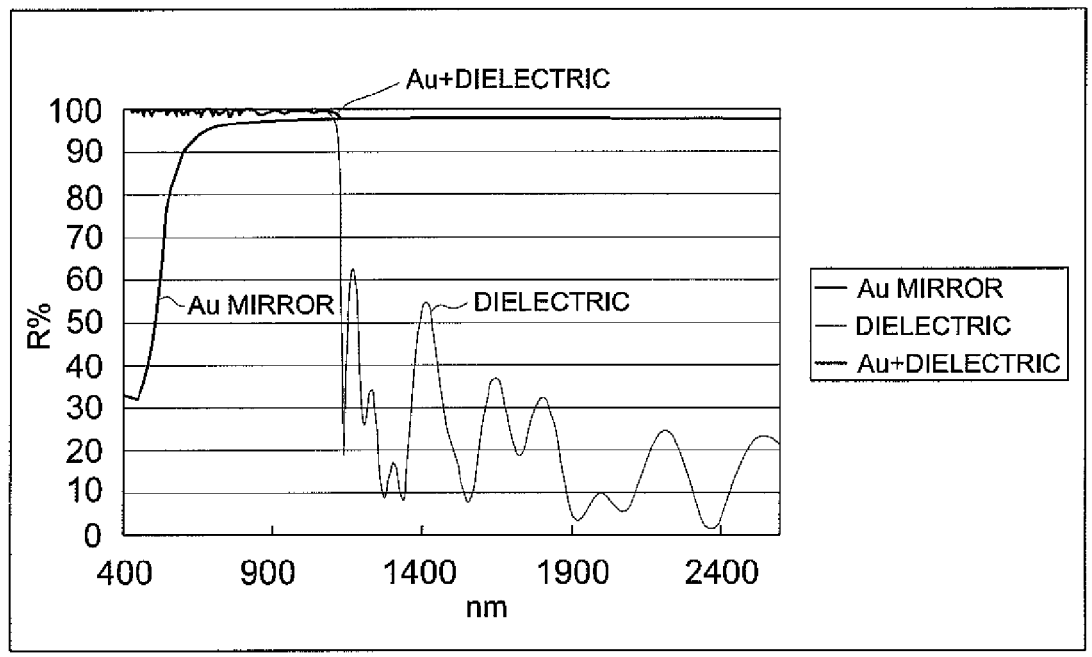
FIG. 15 is a drawing showing the reflection characteristic at the time that light was made to enter with an incidence angle of 20 degrees, in the example in which a metal vapor-deposited film made from a material of Au and the dielectric multilayer were formed.
Figure 16:
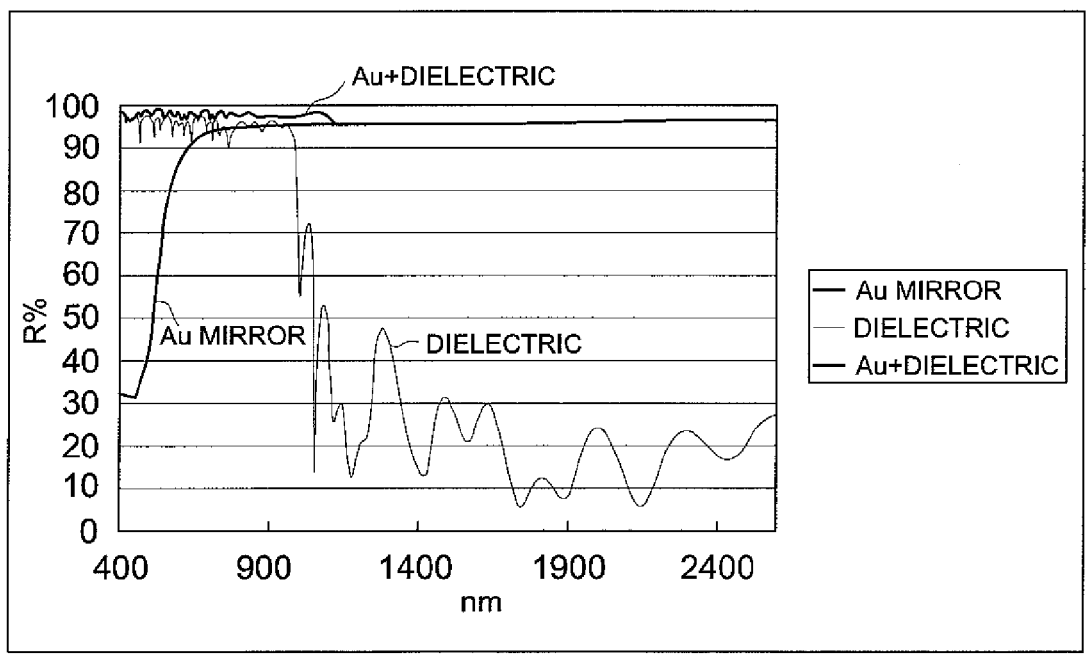
FIG. 16 is a drawing showing the reflection characteristic at the time that light was made to enter with an incidence angle of 50 degrees, in the example in which a metal vapor-deposited film made from a material of Au and the dielectric multilayer were formed.
Figure 17:
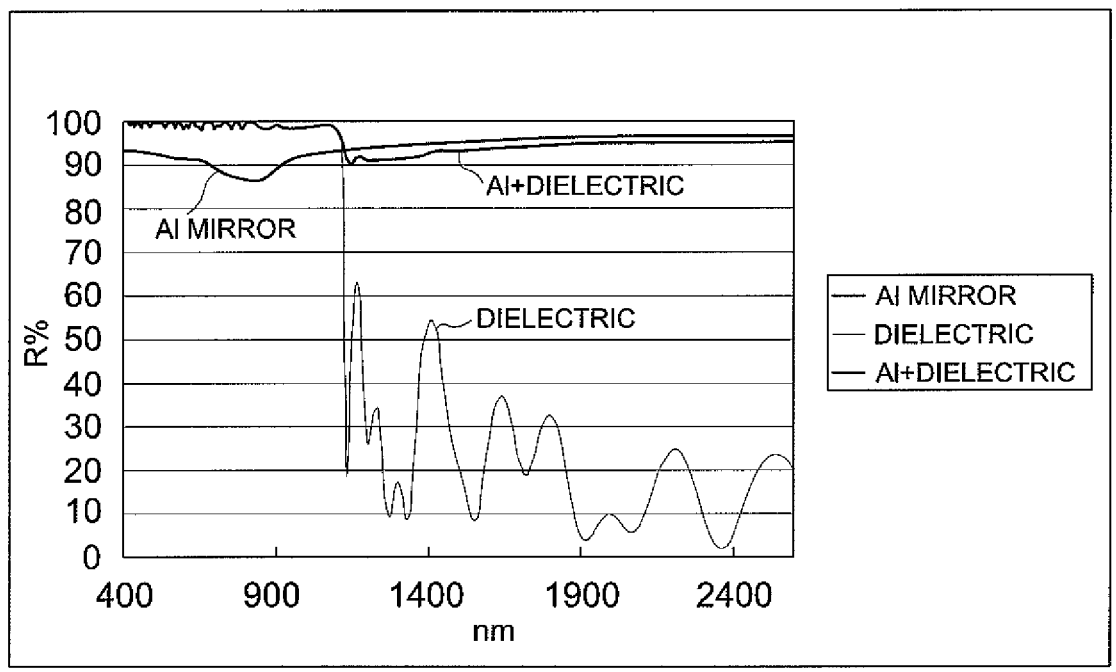
FIG. 17 is a drawing showing the reflection characteristic at the time that light was made to enter with an incidence angle of 20 degrees, in the example in which a metal vapor-deposited film made from a material of Al and the dielectric multilayer were formed.
Figure 18:
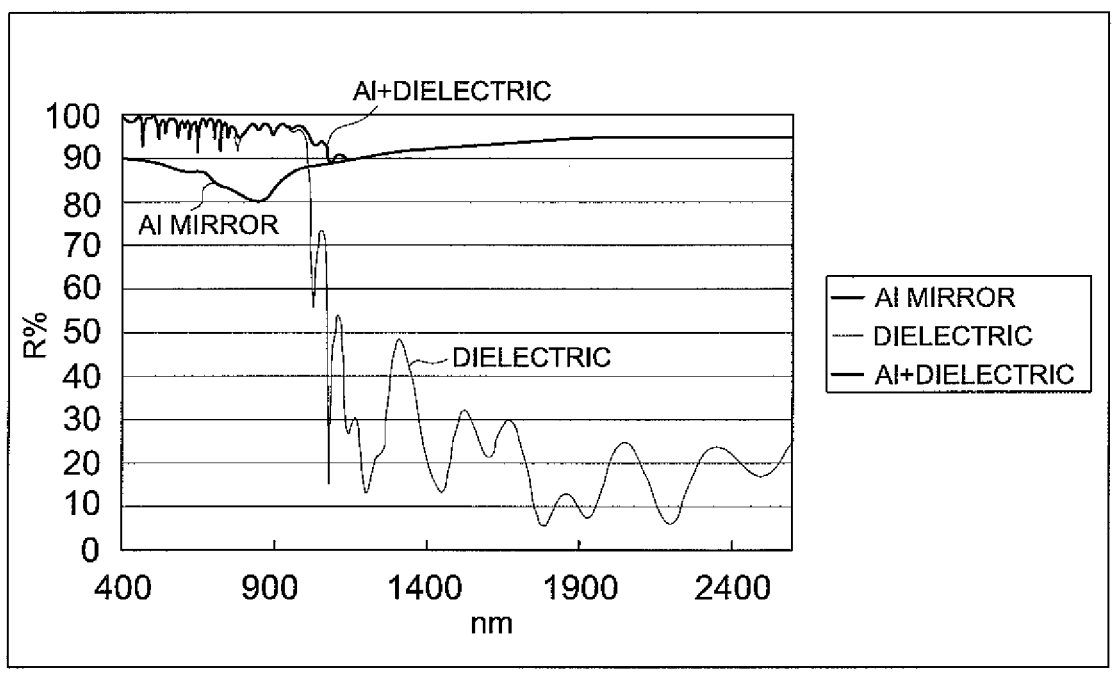
FIG. 18 is a drawing showing the reflection characteristic at the time that light was made to enter with an incidence angle of 50 degrees, in the example in which a metal vapor-deposited film made from a material of Al and the dielectric multilayer were formed.

In the example in which the dielectric multilayer shown in Table 1 was formed on a light entering surface of a glass-made base plate and a metal vapor-deposited film made from a material of Cu was formed on a surface of the base plate at the opposite side to the light entering surface, FIG. 13 is a diagram showing the reflection characteristic at the time that light was made to enter with an incidence angle of 20 degrees. In the same example, FIG. 14 is a diagram showing the reflection characteristic at the time that light was made to enter with an incidence angle of 50 degrees. In the example in which the dielectric multilayer shown in Table 1 was formed on a light entering surface of a glass-made base plate and a metal vapor-deposited film made from a material of Au was formed on a surface of the base plate at the opposite side to the light entering surface, FIG. 15 is a diagram showing the reflection characteristic at the time that light was made to enter with an incidence angle of 20 degrees. In the same example, FIG. 16 is a diagram showing the reflection characteristic at the time that light was made to enter with an incidence angle of 50 degrees. In the example in which the dielectric multilayer shown in Table 1 was formed on a light entering surface of a glass-made base plate and a metal vapor-deposited film made from a material of Al was formed on a surface of the base plate at the opposite side to the light entering surface, FIG. 17 is a diagram showing the reflection characteristic at the time that light was made to enter with an incidence angle of 20 degrees. In the same example, FIG. 18 is a diagram showing the reflection characteristic at the time that light was made to enter with an incidence angle of 50 degrees.

TABLE 1

Layer configuration in a dielectric layer

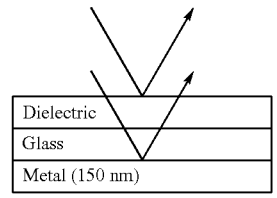

| | Grass | (nm) |
|---|---|---|
| 1 | TIO2 | 85.66 |
| 2 | SIO2 | 154.21 |
| 3 | TIO2 | 90.44 |
| 4 | SIO2 | 190.02 |
| 5 | TIO2 | 105.43 |
| 6 | SIO2 | 164.45 |
| 7 | TIO2 | 87.39 |
| 8 | SIO2 | 215.1 |
| 9 | TIO2 | 99.68 |
| 10 | SIO2 | 151.58 |
| 11 | TIO2 | 114.96 |
| 12 | SIO2 | 148.02 |
| 13 | TIO2 | 80.5 |
| 14 | SIO2 | 136.27 |
| 15 | TIO2 | 61.79 |
| 16 | SIO2 | 94.62 |
| 17 | TIO2 | 66.65 |
| 18 | SIO2 | 122.13 |
| 19 | TIO2 | 25.09 |
| 20 | SIO2 | 90.47 |
| 21 | TIO2 | 74.51 |
| 22 | SIO2 | 140.79 |
| 23 | TIO2 | 72.49 |
| 24 | SIO2 | 112.93 |
| 25 | TIO2 | 71.26 |
| 26 | SIO2 | 116.06 |
| 27 | TIO2 | 78.12 |
| 28 | SIO2 | 116.27 |
| 29 | TIO2 | 133.48 |
| 30 | SIO2 | 86.5 |
| 31 | TIO2 | 53.86 |
| 32 | SIO2 | 109.19 |
| 33 | TIO2 | 63.7 |
| 34 | SIO2 | 90.45 |
| 35 | TIO2 | 34.73 |
| 36 | SIO2 | 93.88 |
| 37 | TIO2 | 52.85 |
| 38 | SIO2 | 67.08 |
| 39 | TIO2 | 46.52 |
| 40 | SIO2 | 86.74 |
| 41 | TIO2 | 303.15 |
| 42 | SIO2 | 57.54 |
| 43 | TIO2 | 52.91 |

TABLE 1-continued

Layer configuration in a dielectric layer

| Grass | | (nm) |
|---|---|---|
| 44 | SIO2 | 199.56 |
| 45 | TIO2 | 62.39 |
| 46 | SIO2 | 66.77 |
| 47 | TIO2 | 32.86 |
| 48 | SIO2 | 81.96 |
| 49 | TIO2 | 30.51 |
| 50 | SIO2 | 95.01 |
| 51 | TIO2 | 97.76 |
| 52 | SIO2 | 161.82 |
|  | Air |  |

Example 2

The film thickness data of the dielectric multilayer used in Example suitably for an optical element shown in FIG. 12 are shown in Table 2.

Figure 19:
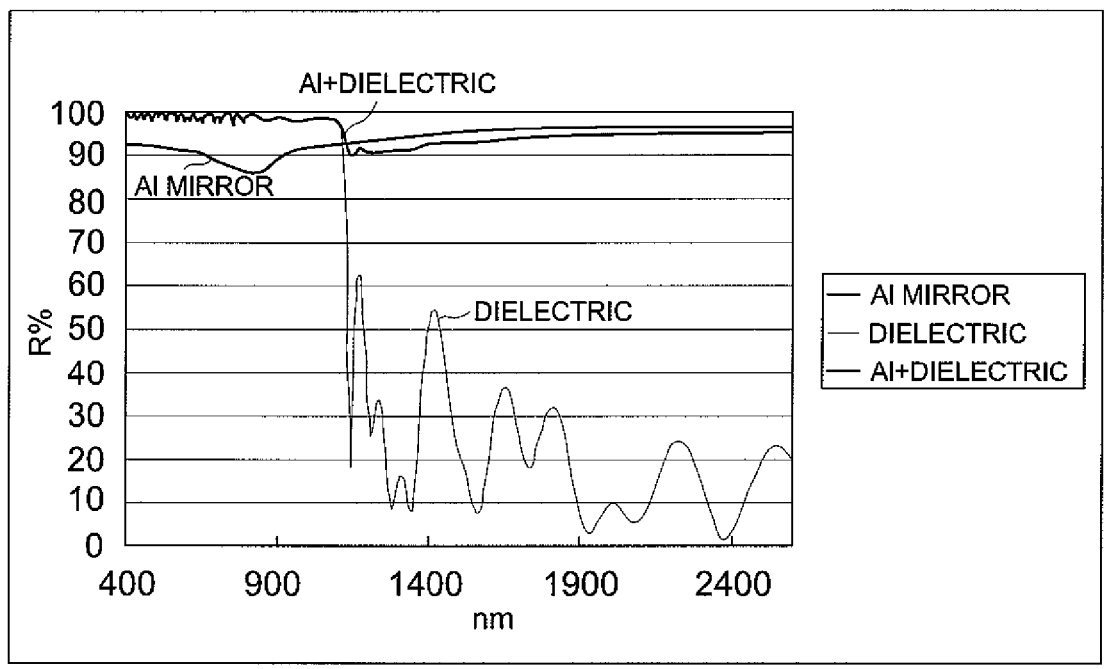
FIG. 19 is a drawing showing the reflection characteristic at the time that light was made to enter with an incidence angle of 20 degrees, in the example in which a metal vapor-deposited film made from a material of Al and the dielectric multilayer were formed.
Figure 20:
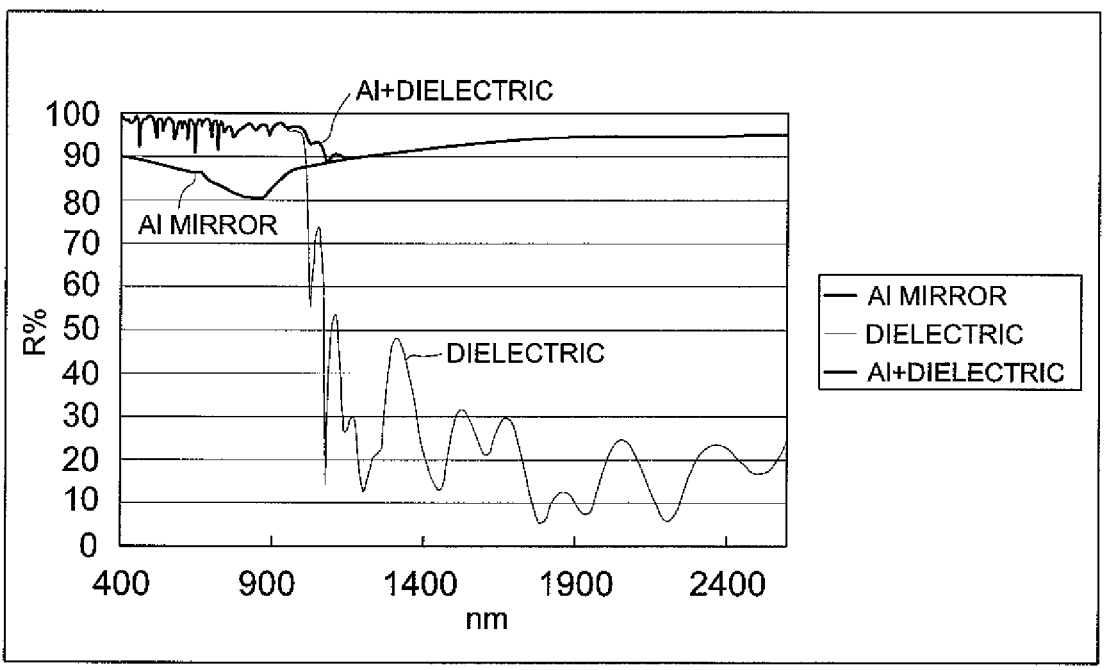
FIG. 20 is a drawing showing the reflection characteristic at the time that light was made to enter with an incidence angle of 50 degrees, in the example in which a metal vapor-deposited film made from a material of Al and the dielectric multilayer were formed.

In the example in which the dielectric multilayer shown in Table 2 and a metal vapor-deposited film made from a material of Al were formed on a light entering surface of a glass-made base plate in this order from the light-entering side, FIG. 19 is a diagram showing the reflection characteristic at the time that light was made to enter with an incidence angle of 20 degrees. In the same example, FIG. 20 is a diagram showing the reflection characteristic at the time that light was made to enter with an incidence angle of 50 degrees.

TABLE 2

Design values

| Glass | |
|---|---|
| AL | 150 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 57.65 |
| SIO2 | 94.5 |
| TIO2 | 74.95 |
| SIO2 | 122.85 |
| TIO2 | 74.95 |
| SIO2 | 122.85 |
| TIO2 | 74.95 |
| SIO2 | 122.85 |
| TIO2 | 74.95 |
| SIO2 | 122.85 |
| TIO2 | 74.95 |
| SIO2 | 122.85 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 92.24 |
| SIO2 | 151.2 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| TIO2 | 109.54 |
| SIO2 | 179.55 |
| Air | |

In any embodiment, the dielectric multilayer had a reflectance ratio of 90% or more for light having a wavelength of 1.0 μm or less and the metal vapor-deposited film had a reflectance ratio of 90% or more for light having a wavelength of 1.0 μm or more. Therefore, in combination of the dielectric multilayer and the metal vapor-deposited film, it was able to provide a reflectance ratio of 90% or more for a wide wavelength band. Furthermore, in the case that an incidence angle is 20 degrees, the dielectric multilayer of this embodiment has a wavelength band having a reflectance ratio of 6% or less at three position in a range of a wavelength of 1.9 μm to 2.4 μm, and in the case that an incidence angle is 50 degrees, the dielectric multilayer of this embodiment has a wavelength band having a reflectance ratio of 8% or less at three position in a range of a wavelength of 1.7 μm to 2.2 μm. Accordingly, the number of layers can be suppressed and incidence angle characteristic can be made good.

As mentioned above, although the present invention has been explained with reference to embodiments, the present invention should not be interpreted as being limited to the above-mentioned embodiment, and of course, modification and improvement can be made suitably.

The invention claimed is:
1. A plate-shaped optical element for reflecting sunlight, comprising:
   a base plate composed of a resin film;

a first reflective film; and
a second reflective film;
    wherein the base plate and the first reflective film are arranged at a sunlight-entering side so that the second reflective film reflects light having passed through the base plate and the first reflective film, the first reflective film has a reflectance ratio of 90% or more for light having a wavelength of 1.0 µm or less and the second reflective film has a reflectance ratio of 90% or more for light having a wavelength of 1.0 µm or more, and
    wherein the first reflective film is a dielectric multilayer film.

2. The optical element described in claim 1, wherein the optical element is an optical element configured to collect the light and to reflect the collected light, wherein the collected light is reflected from a plurality of reflective mirrors arranged to reflect the light towards the optical element.

3. The optical element described in claim 1, wherein the second reflective film is a metal vapor-deposited film.

4. The optical element described in claim 3, wherein the dielectric multilayer film is formed on a sunlight-entering surface of the base plate and the metal vapor-deposited film is formed on a surface opposite to the sunlight-entering surface.

5. The optical element described in claim 3, wherein the dielectric multilayer film and the metal vapor-deposited film are formed on a surface opposite to a sunlight-entering surface of the base plate.

6. The optical element described in claim 3, wherein the metal vapor-deposited film is a metal vapor-deposited film made from a material of Al.

7. The optical element described in claim 3, wherein the metal vapor-deposited film is a metal vapor-deposited film made from a material of Au.

8. The optical element described in claim 3, wherein the metal vapor-deposited film is a metal vapor-deposited film made from a material of Cu.

* * * * *